United States Patent

[11] 3,610,376

[72] Inventors: Pierre Baronnet
Sansibar Strasse 38, 8 Munich 32, Germany;
Jean Lamotte, 31 bis, Rte. de Versailles, 78-Port-Marly; Henri Tainguy, 41, Rue Jean Jaures, 92-Levallois-Perret, France
[21] Appl. No. 816,314
[22] Filed Apr. 15, 1969
[45] Patented Oct. 5, 1971
[32] Priority Apr. 26, 1968, Mar. 21, 1969
[33] France
[31] 149801 and 6908435

[54] AUTOMATIC ADJUSTMENT LINK
5 Claims, 5 Drawing Figs.
[52] U.S. Cl. .................................................. 188/202,
188/196 D
[51] Int. Cl. ............................................... F16d 65/56

[50] Field of Search ............................................. 188/196,
202 PL

[56] References Cited
UNITED STATES PATENTS
2,225,001 12/1940 Browall ....................... 188/202
2,246,873 6/1941 Browall ....................... 188/202

Primary Examiner—George F. A. Halvosa
Attorney—Alfred W. Breiner

ABSTRACT: Automatic transmission link for transmitting braking forces on railway vehicles comprising a casing, a rod fitted thereinto and formed with a screw thread thereon for reversible cooperation with a nut, a tensioned recovery spring bearing against said nut, a trigger continuously urged against said nut by an axially disposed spring, and locking and actuating means operating by self-tightening springs.

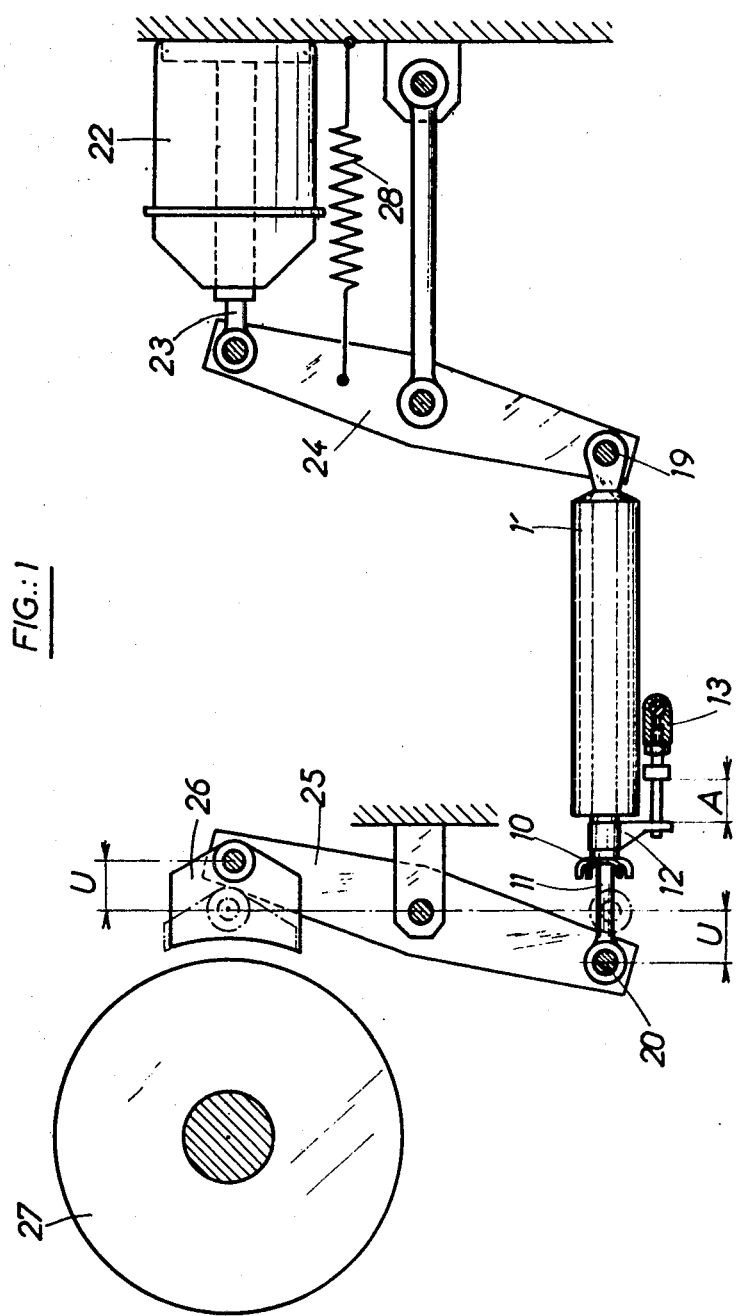
FIG.:1

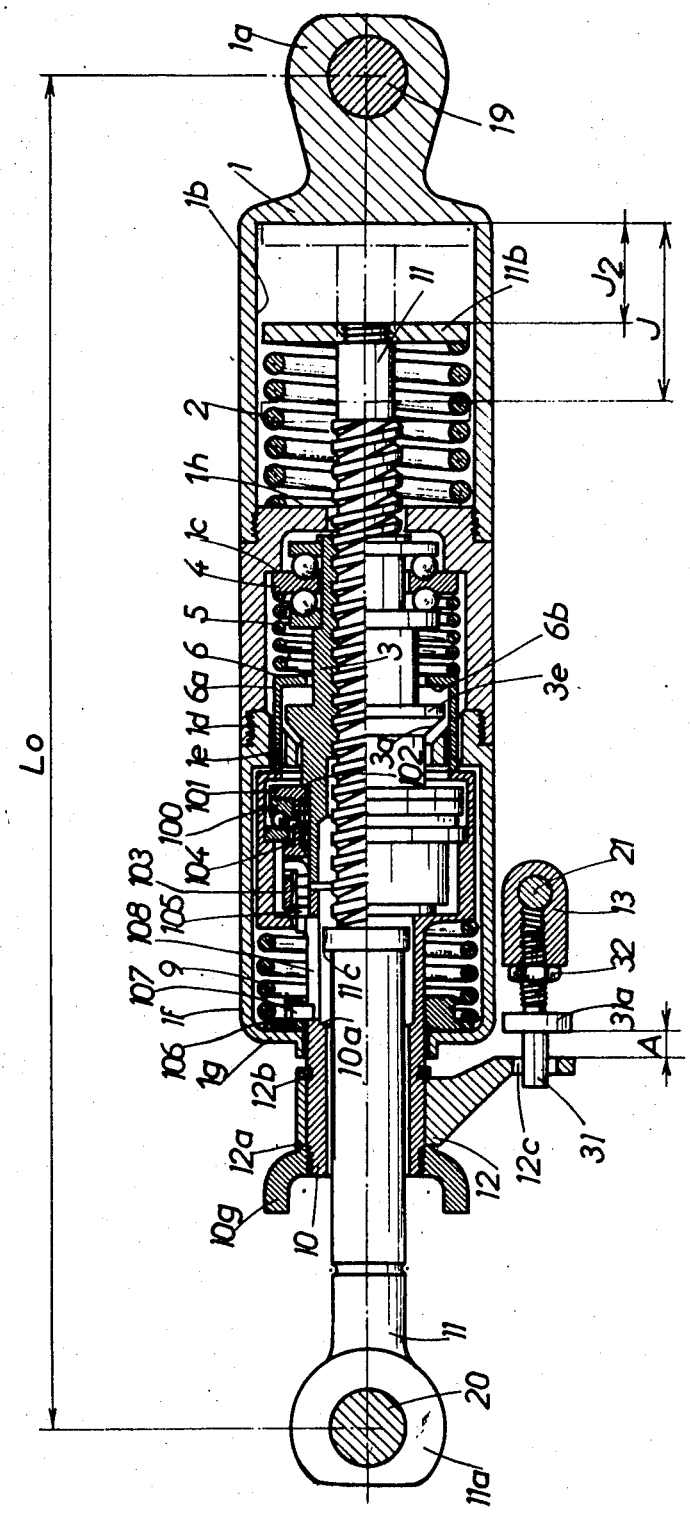

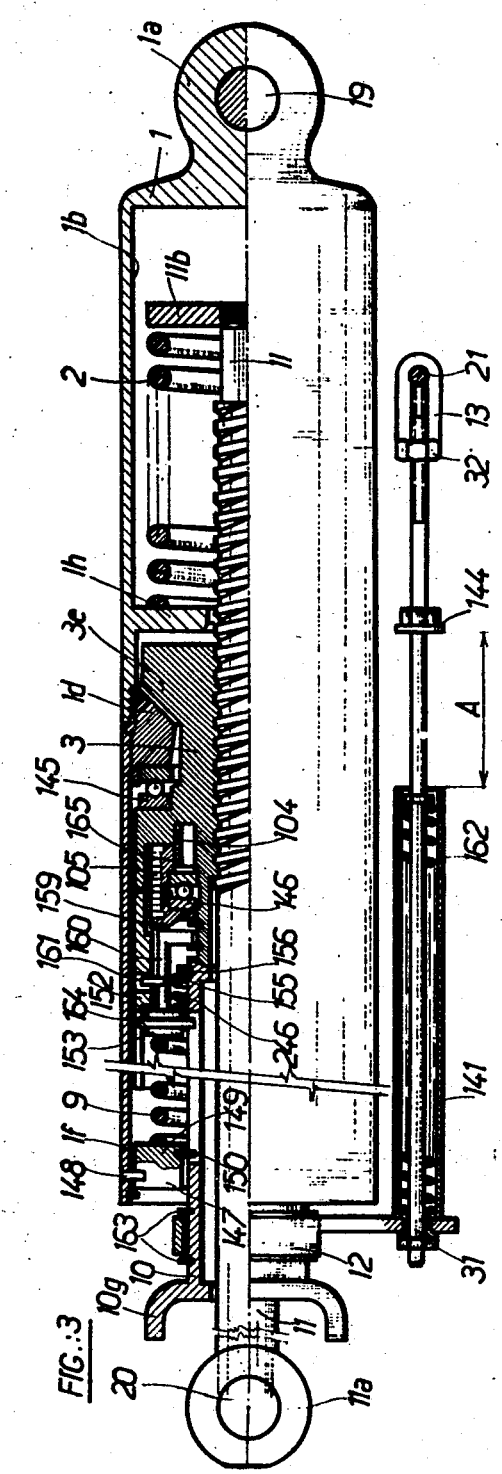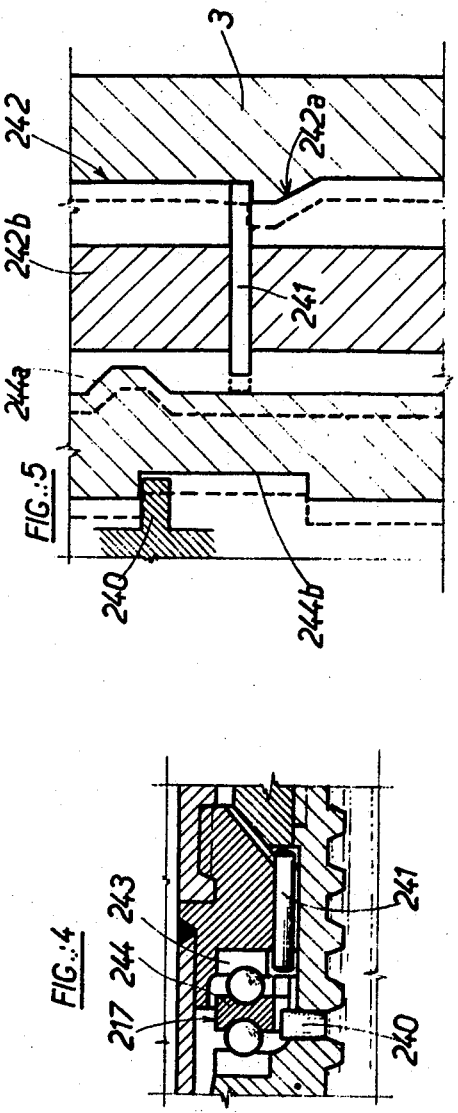

AUTOMATIC ADJUSTMENT LINK

BACKGROUND OF THE INVENTION

Automatic transmission links are already known, more particularly for transmitting braking forces on railway vehicles. Prior art devices of this kind most notably include single or double-acting adjusters, of the normal or fast-acting locking or nonlocking type, depending on whether the length is always adjusted in the same sense or both ways (lengthening and shortening,), it being possible for such adjustment to be effected either instantly or gradually.

SUMMARY OF THE INVENTION

The present invention relates to an automatic link of this kind which can be mounted in lieu of a load transmitting rod and which constitutes an improvement over the devices used heretofore from the point of view both of reliability and effectiveness of the adjustments. This invention relates to a double-acting adjuster which is impervious to shock and which adapts to the required length, alike in the shortening sense and the lengthening sense, as soon as it operates for the first time.

The subject device of this invention includes a tubular casing, a rod disposed therein and embodying a threaded portion, a nut engaged over said threaded portion of the rod and rotatable in either direction, latching means for preventing rotation of said nut and for locking the device in its inactive position, and means for causing the nut to rotate relatively to the rod and thereby lengthen or shorten the device.

The advantages possessed by a device according to this invention are numerous and include the following in particular:

The power transmitted is limited only by the size of the device.

Braking loads can be transmitted even if the adjustment system should fail to operate for any reason.

The device is impervious to shock.

It can be adjusted manually.

The change in length may attain the total lengthening or shortening capacity from the outset of the first adjustment, which avoids the disadvantages of certain prior art devices in which the change in length occurs stepwise each time a load is transmitted.

BRIEF DESCRIPTION OF THE DRAWINGS.

FIG. 1 schematically illustrates a system for transmitting braking forces between an actuating cylinder and brake shoes that incorporates the subject device of this invention.

FIG. 2 is a sectional view of the adjustment device proper.

FIG. 3 is a sectional view of a link according to the invention in its brakes-released position.

FIG. 4 is a partial sectional showing of an alternative embodiment.

FIG. 5 is a developed partial view of FIG. 2.

DETAILED DESCRIPTION

Reference is first had to FIG. 1 for a portrayal of an adjustment device according to the invention as applied to a railway vehicle brake linkage, the adjuster 1' being interposed between brake cylinder 22 and a wheel 27 of the vehicle. The transmission system includes:

the cylinder 22, whose piston 23 is connected to a link 24, which cylinder is supplied in any convenient manner with fluid under preferably adjustable pressure;

the master link 24 which transmits the braking force to one or more axle linkages 25 the function of which is to distribute said force to the brakeshoes 26;

a main return spring 28.

Dependability an proper operation of the system require that the piston stroke P needed to apply the brakeshoes 26 against the wheels 27 remain virtually constant notwithstanding the possible wear U on the brakeshoes 26 or relative variations in the heights of the shoes 26 with respect to the wheels 27.

FIG. 2 shows the adjuster device according to the invention in the brakes-released position. The device comprises a casing 1 which, as is clearly visible in the drawing, is made of a plurality of sections which, in the exemplary embodiment depicted, are screwed together for reasons of convenience in machining, fabrication and assembly which will emerge hereinafter.

A rod 11 is disposed slidably inside casing 1.

The free end of rod 11, namely the end located outside casing 1, terminates in a yoke 11a cooperating with the pin 20; similarly, the opposite end of casing 1 terminates in a yoke 1a cooperating with pin 19.

Proximate the yoke 1a, casing 1 forms a housing 1b containing a spring 2 capable of being compressed over a length J, where J is the adjuster's capacity for changing length. Spring 2 reacts at one end against a flat seat 1h rigid with casing 1 and at the other end against a plate 11b removably secured in any convenient manner to the end of rod 11.

The central portion of rod 11 is threaded and cooperates with a nut 3. The pitch of the screw thread is chosen so that the screwnut system be capable of reverse operation, i.e. so that a traction or compression force of sufficient magnitude applied to rod 11 causes nut 3 to rotate freely. To this end recourse is preferably had to a screw with a plurality of threads whose angles of slope are sufficiently great.

The length of the threaded section must be enough to accommodate the change in length in the adjuster, that is to say that it must be at least equal to J plus the length of the nut.

Nut 3 is formed externally with a frustoconical portion 3e capable of abutting against a matchingly shaped seat 1d integral with casing 1. The seat 1d is formed with two openings 1e which are diametrically opposed in relation to the longitudinal axis of the device and parallel thereto. These openings serve to guide rods 6a of a ram 6 whose function will be explained hereinafter.

Casing 1 is extended by a tube 1f forming a guide for a spring 9, and this spring reacts against an annular end wall 1g of the tube, that serves also as a guide for the rod 11.

Spring 9 additionally reacts against a trigger 10, which in turn bears against the nut 3 through the agency of a ball thrust-bearing 100 and a ring 101.

As stated precedingly, compression spring 2 bears at one end against the flat seat 1h of casing 1 and at the other end against the plate or base 11b of rod 11 and constantly urges the latter towards the right of the figure, that is to say in the direction tending to shorten the adjuster. In cases where spring 2 is almost completely relaxed, i.e. when the clearance $J_2$ between plate 11b and the end of housing 1b is virtually nil, it must nevertheless be capable of shortening the adjuster by actuating the linkage, which in turn requires that spring 2 be fitted into the device with a certain degree of precompression.

At the end of the threaded section, adjacent yoke 11a, rod 11 is formed with a collar 11c which, as the rod moves, entrains the trigger 10 through the medium of a shoulder 10a formed thereon.

Nut 3 supports a double-acting ball-thrust 4, the two outer races of which rotate fixedly with the nut. A shoulder 1c formed on casing 1 acts as an abutment for the middle ring of ball-thrust 4, which ring has a diameter greater than that of the outer races. A spring 5 concentric with the nut bears at one end against the middle ring of ball-thrust 4 and at the other end against a shoulder 6b on ram 6.

Between trigger 10 and nut 3 is mounted a selftightening double spring-type clutch device devised as follows:

A ball-thrust 100, one of whose races bears against an inner shoulder on trigger 10 and whose other race is rigid with a part 101; bears against 101. shoulder 102 on nut 3. Between part 101 and a ring 103 is mounted a prestressed self-locking spring 104. Between part 103 and trigger 10 is likewise mounted a self-locking spring 105 which is fitted initially with some radial clearance. Spring 104 has its outer periphery bearing at once against 101 and 103 and is capable of acting as a freewheel system. The control system includes a rod 13 rigid with shaft 21. Rod 13 terminates in a threaded portion which engages with a guide 31 whose position in relation to rod 13 is fixed by a locknut 32. Guide 31 carries a collar 31a which forms a stop and is capable of shifting trigger 10 leftwards of the device through the agency of a member 12 formed with a hole 12c therein cooperating with rod 31. Member 12 is freely rotatable over trigger 10 but cannot be translated in relation thereto, being clamped at 12a against a shoulder on trigger 10 and at 12b against a stop ring. The device hereinbefore disclosed functions in the following manner:

In the brakes-released position, the various component parts of the device provide the overall configuration depicted in FIG. 2, shaft 21 being rigid with the frame of the machine.

AS already stated, ram 6 comprises two guides 6a extending through the openings 1e formed in frustoconical portion 1d, and a flat base 6b. The two guides bear against the right hand end of trigger 10, and in the brakes-released position a clearance exists between shoulder 3e of nut 3 and the base 6b. Compression spring 5, which reacts at one end against base 6b and at the other against the middle ring of double-acting ball-thrust 4, continuously urges ram 6 against trigger 10. Spring 5 is mounted with some degree of precompression, the magnitude of which is slightly greater than the minimum axial force to be exerted against rod 11 to rotate nut 3. Thus an adequate pull exerted on rod 11 will cause free rotation of the nut and a lengthening of the device without the frustoconical portions 3a and 1d being fetched into contact so long as trigger 10 remains in position. Manifestly, the precompression in spring 9 must be greater than that in spring 5 for the various component parts to assume the positions shown in FIG. 2.

It is now proposed to analyze in detail the successive stages in the operation of the subject adjuster of this invention, in the three hypothetical situations in which the clearance between brakeshoes 26 and wheel 27 is respectively normal, to big, and too small.

If the clearance in question is normal, then actuation of piston 22 to apply the brakes will leave the distance Lo between pins 19 and 20 constant so long as member 12 does not contact stop 31a, in other words so long as the adjuster shifts through a distance of less than A, for in the brakes-released position shown in FIG. 2 the adjuster is locked and cannot shorten itself. Spring 2 acts through rod 11 on nut 3, which is thus urged to rotate and itself acts upon part 101 via its shoulder 102, against which part 101 is applied by the force of spring 9. Part 101 itself tends to entrain part 103 via the spring 104, and the rotation of part 103 causes contraction of spring 105, which in so doing rigidly unites trigger 10 and nut 3 by binding them against its inner periphery. Trigger 10 is angularly rigid with a ring 106 having a tongue 107 engaging into a groove 108 formed in trigger 10. Ring 106 is pressed against shoulder 1g by spring 9, and the friction forces are sufficient to prevent rotation of trigger 10 and hence of nut 3 responsively to the force of spring 2 only.

When the adjuster has moved through the distance A, the brake shoes 26 are in contact with wheel 27.

When member 12 meets stop 31a it is arrested. As soon as spring 9 has been compressed, ring 101 is no longer applied against shoulder 102, thereby allowing spring 105 to revert to its original diameter and simultaneously causing the compound 12,10, 103, 105, 100, 101, 104, 3 and 6 to shift leftwardly relatively to the casing. This is of course a relative movement only, member 12 being halted by fixed stop 31a and the casing continuing its motion rightwardly, in response to the force transmitted by the piston, until frustoconical portion 3e contacts 1d. The adjuster is then locked axially and angularly and transmits the braking force.

If the clearance between the brakeshoes and the wheels is too big, member 12 contacts shoulder 31a before the brake shoes have contacted the wheel. Consequently, when the piston exerts thrust, member 12 bears against shoulder 31a and moves trigger 10 towards the left of the figure relatively to the casing, compressing spring 9 in the process. Shoulder 102 of nut 3 no longer bears against part 101, leaving spring 105 free to revert to its initial position in which it does not rigidly unite trigger 10 and nut 3. The latter can rotate responsively to the force exerted by spring 2 and shorten the length Lo at the same time as the linkage is actuated until the brake shoes contact the wheel. Thereafter the length Lo corresponds to the normal clearance and the subject device of the invention will lock as precedingly described. Should the clearance between the brakeshoes and the wheel be too small, contact therebetween will occur before member 12 has abutted against shoulder 31a. When the thrust from actuator 22 develops a pulling force in rod 11 greater than that exerted by spring 1, nut 3 rotates and shifts part 101 in the direction required to the lengthen the adjuster, with spring 105 functioning as a freewheel system. In this direction of rotation moreover, spring 105 tends to distend, thus freeing the nut and allowing it to rotate. This rotation continues until member 12 contacts the stop 31a, i.e. until the length Lo corresponds to a normal clearance. The locking process then occurs as described in the case of a normal clearance between the brakeshoes and the wheel.

As the brakes are being released, spring 2 relaxes as soon as the braking force decreases sufficiently, thereby restoring the clearance between frustoconical portions 3a and 1d. Spring 9 then relaxes and restores friction between part 101 and shoulder 102. In consequence, spring 104 has its outer diameter increased, thereby entraining part 103 and causing spring 105 to constrict and rigidly unite nut 3 with trigger 10, thus locking the unit against shortening. As the brake releasing process continues, the clearance A is restored and the linkage reverts to the brakes-released position.

Should rupturing occur or should the actuating system fail to operate, shoulder 11c on rod 11 will contact shoulder 10a on trigger 10 and will drive the latter and initiate the same cycle of operations as when member 12 bears against shoulder 31a. The adjuster is then locked.

The length of the adjuster can be increased or decreased while the vehicle is stationary. For instance, if a lever is used to move member 12 away from shoulder 1g, the adjuster will shorten itself since this action is exactly the same as if member 12 were to bear against shoulder 31a in the functional mode in which the clearance between the brakeshoes and the wheel is too big. In contradistinction, if trigger 10 is rotated by means for example of a lever engaged over the serrated portion 10g on the trigger, nut 3 will be rotated in the direction for lengthening the adjuster, due to the provision of self-locking spring 105, for rotation of the trigger in the lengthening direction or rotation of the nut in the shortening direction both produce a constricting of spring 105 which rigidly unites nut 3 and trigger 10.

The embodiment shown in FIG. 3 includes a casing 1 within which is slidable a rod 11 having its free end terminating in a yoke 11a, the opposite end of casing 1 likewise comprising a yoke 1a cooperating with pin 19.

Casing 1 is formed with a housing 1a containing a spring 2 which reacts at one end against a flat seat 1h rigid with casing 1 and at the other end against a base 11b fixed to the end of rod 11.

The central portion of rod 11 is threaded and cooperates with a nut 3 the pitch of which is so chosen that the screwnut system is capable of reversible operation.

Nut 3 is formed with a frustoconical portion 3e which may abut against a frustoconical seat 1d rigid with casing 1, the latter being extended by a tube 1f forming a thrust guide for a spring 9 through the agency of means to be described hereinafter.

Spring 9 is capable of urging a trigger 10 against nut 3 and tends to retract trigger 10 into casing 1.

Secured to the end of trigger 10 by circlips 163, but freely rotatable thereon, is a member 12 capable of being entrained by a rod 31 sliding in case 141 and continuously biased by a spring 162.

In the brakes-released position the various component parts of the adjuster are in the positions shown in FIG. 3. By means of adjusting rod 11, spring 2 keeps nut 3 away from frustoconical abutment 1d. Through the medium of a ball-thrust 145, nut 3 bears against casing 1, and trigger 10 is urged thereinto by spring 9.

Ring 153 bears two diametrically opposed dowels 164 which slide in two longitudinal groves formed in trigger 10 and in two grooves formed in a part 152 the function of which will be explained hereinafter.

As spring 9 bears against ring 153 it causes friction between a part 160 and a ring 159 against which the part 160 bears.

Ring 159 also bears against a ball-thrust 146, which in turn bears against a shoulder on nut 3, which bears in turn against casing 1 via a ball-thrust 145.

A spring 246 reacting against ring 153 thrusts trigger 10 into the casing through the medium of a washer 155 which is retained on the trigger by a circlip 156, whereby, in the brakes-released position, the frustoconically shaped end of the trigger contacts a matchingly shaped portion of the end of nut 3. By reason of this contact, rotation of nut 3 in the adjuster lengthening direction, responsively to a pull, is impossible.

Responsively to spring 2, nut 3 is urged to rotate in the adjuster shortening direction, whereby a part 165, driven by nut 3 through the agency of spring 104 whose coils tend to distend in that direction of rotation of nut 3, tends to rotate in the same direction. Anchored in part 165 is one end of a spring 105 whose other end is anchored on part 159, and spring 105 is prestressed whereby its inner periphery exerts pressure on parts 165 and 159.

Part 159 is prevented from rotating by friction with part 160, the latter being in turn prevented from rotating by a dowel 161 cooperating with a suitable recess in part 152, the latter being likewise prevented from rotating by dowels 164.

Sliding at the other end of trigger 10 is a ped 150 rigid with a ring 149 bearing against a part 147 through a system of rounded serrations. A dowel 148 rigidly unites part 147 with casing 1. Part 165 thus tends to drive spring 105 in the direction tending to distend its coils, so that the outer surfaces of the latter rigidly unite nut 3 with part 152. Since the latter is prevented from rotating, nut 3 cannot rotate in the direction tending to shorten the adjuster.

When the brake is applied, pin 19 carries the casing of the adjuster towards the right of FIG. 3. From the outset of this motion, trigger 10 is held immovable and spring 246 is compressed since the force of spring 162 is greater than that of spring 246. The associated frustoconical portions on trigger 10 and nut 3 separate and the adjuster can then increase its length.

When motion of trigger 10 causes dowels 164 to bear against the bottom of the grooves in the trigger, spring 162, which is weaker than spring 9, compresses until the shoulder on nut 144 contacts the case 141 of spring 162. Thereafter, any additional movement of the casing compresses spring 9 and separates parts 153 and 160 when the frustoconical portion of nut 3 contacts the frustoconical abutment 1d of casing 1.

If the clearances are normal, the brakeshoes will then be in contact with the wheels and the braking force will be transmitted by casing 1, nut 3 and rod 11.

When the brake is released spring 9 relaxes until part 153, as it bears against parts 159 and 160 and thrust away nut 3 through the medium of ball-thrust 146.

If the clearances are too small, the threaded rod 11 will be kept immovable through contact of the brake shoes with the wheels before the bearing surface of nut 144 contacts case 141. Responsively to the pull then exerted, nut 3 bears against ball-thrust 146 and rotates to lengthen the adjuster. In this direction of rotation of nut 3, the coils of springs 104 and 105 tend to decrease in diameter, so that only nut 3 rotates.

This rotation of the nut continues until nut 144 contacts case 141. The adjuster then functions as described precedingly with reference to normal clearances.

If the clearances are too great, the brake shoes will not yet have contacted the wheels when the bearing surface of nut 144 contacts case 141. When this happens, spring 9 will be compressed, thus cancelling the friction between parts 159 and 160, whereby spring 105 can constrict itself and drive the part 159, disengaging nut 3 and part 152 in response to spring 2, whereby nut 3 rotates in the screwing-up direction and entrains rod 11. During this screwing-up motion, nut 3 bears against abutment 145.

When the brakeshoes make contact with the wheels, the frustoconical portions of nut 3 and casing 1 come into contact and the adjuster thereafter operates in the same way as when a normal clearance exists.

The useful length of the adjuster can be modified manually either in order to shorten it (by moving trigger 12 so as to compress spring 9) or in order to lengthen it (by screwing in the trigger, thereby distending spring 105 and driving the nut). The subject adjuster of this invention permits total lengthwise adjustment from the outset of the initial brake application. Alternatively, the change in the length of the adjuster could be limited, during elongation, by resorting to the arrangement depicted in FIGS. 4 and 5.

In this case rotating nut 3 comprises a shoulder 242 bearing one or two axial protrusions 242a, 242b.

The ball-thrust 145 in FIG. 1 is replaced by a double-acting ball-thrust 217, and the middle ring 244 thereof is similarly formed with an axial protrusion 244a. A peg 240 rigid with the nut is freely movable within a circular channel 244b of ring 244.

The protrusions 244a and 242a are capable of pushing in a stub 241 which slides axially in nut 3 with a slight degree of friction whereby to remain in position when not acted upon by said protrusions.

FIG. 3 shows the positions of the various parts at the end of the unscrewing process.

After the adjuster has been locked, the nut moves leftwardly of the figure, whereby the parts assume the positions shown in dash lines and the shoulder 242 can be disengaged when the brakes are released, with nut 3 reverting to the position shown in solid lines.

When the brake is applied and if the adjuster must be lengthened, ring 244 is shifted by nut 3 through the medium of peg 240 and protrusion 244a pushes stub 241 towards the right of the figure, whereby nut 3 locks when protrusion 242a abuts against stub 241. Thus the extent to which the adjuster is lengthened is limited to the amount corresponding to a rotation of the nut through approximately 360°.

When the brakes are applied and a shortening takes place, the shape of the protrusions is such that stub 241 is subsequently pushed in by protrusions 242a and 244a, so that it undergoes uninterrupted reciprocating motion.

We claim:

1. For a brake system of the kind having an actuator means, a pad carrier means and a stationary trigging abutment, an automatic load transmitting link device of self-adjustable effective length interrelating said actuator means, pad carrier means and trigging abutment, comprising:
   a tubular casing having an inner flange and an outer connector for connection with either one of said means,
   a rod telescopably fitted into said casing, having an internal flange opposite said casing flange and an external connector for connection with the other one of said means, said effective length being the distance between said connectors,
   a trigger freely extending about said rod, having an inner portion extending inside said casing and an outer portion projecting outside said casing for cooperation with said trigging abutment, said trigger being fast against rotation relative to said casing but bodily slidable outward therefrom upon said outer portion of said trigger being engaged by said trigging abutment,
   a power spring extending between said opposite flanges and urging said rod inwardly of said casing,
   a nut housed in said casing, permanently engaging a screw thread formed on said rod and of such pitch as to make said nut nonself-locking and rotatable about said rod upon relative translation thereof, cooperating coned members respectively integral with said casing and said nut and normally spaced from each other but mutually engageable in close fit to frictionally lock said nut with respect to said casing, a frictionless thrust bearing interposed between a nut and said trigger to allow free relative rotation thereof, a coupler system bypassing said thrust bearing and comprising, in series succession assembly, a first self-lockable spring adapted for free-wheellike action, and a second self-lockable spring adapted for clutchlike action, one of said first and second springs being operatively associated with said nut and the other of said first and second springs being operatively associated with said trigger, and a return spring permanently urging said trigger to bear against said nut through said thrust bearing and said bypassing coupler system, said bodily slidable displacement of said trigger outward from said casing upon engagement of said outer portion by said trigging abutment, taking place against the action of said return spring to declutch said coupler system, whereby said nut is free to rotate relatively to said casing upon said relative translation of said rod, until said coned members lockingly engage each other.

2. Link device as claimed in claim 1 further comprising an end flange integral with said casing and through which said outer portion of said trigger freely projects, and a bottom flange slidably fitted on said inner portion of said trigger but fast against rotation relatively thereto, said return spring extending between said trigger inner portion and said slidable bottom flange to apply the same in clamping engagement with said end flange, whereby said trigger is prevented from rotating relatively to said casing while being slidably displaceable relative thereto.

3. Link device as claimed in claim 1 wherein said coupler system further comprises an intermediate bridge member separate from both said nut and said trigger, and operatively associated with both said first spring and second spring to constitute therewith said series succession assembly.

4. Link device as claimed in claim 1, wherein said nut is end abuttable against said inner portion of said trigger.

5. Link device as claimed in claim 4 wherein said nut and said trigger comprise matching frustoconical portions whereby said nut is end abutted against said trigger.